(12) United States Patent
Eroz et al.

(10) Patent No.: US 10,263,814 B2
(45) Date of Patent: *Apr. 16, 2019

(54) METHOD AND SYSTEM FOR PROVIDING SCRAMBLED CODED MULTIPLE ACCESS (SCMA)

(71) Applicant: Hughes Network Systems, LLC, Germantown, MD (US)

(72) Inventors: Mustafa Eroz, Germantown, MD (US); Lin-Nan Lee, Potomac, MD (US); Lakshmi Iyer, Mumbai (IN); Neal Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,814

(22) Filed: Sep. 1, 2016

(65) Prior Publication Data

US 2016/0373278 A1    Dec. 22, 2016

Related U.S. Application Data

(63) Continuation of application No. 13/742,635, filed on Jan. 16, 2013, now Pat. No. 9,461,765, which is a
(Continued)

(51) Int. Cl.
*H04L 1/18* (2006.01)
*H04L 25/03* (2006.01)
*H04L 1/00* (2006.01)
*H04J 11/00* (2006.01)
*H04L 7/04* (2006.01)

(52) U.S. Cl.
CPC ...... *H04L 25/03866* (2013.01); *H04J 11/003* (2013.01); *H04J 11/0046* (2013.01); *H04L 1/009* (2013.01); *H04L 1/0041* (2013.01); *H04L 1/0048* (2013.01); *H04L 1/0057* (2013.01); *H04L 1/0058* (2013.01); *H04L 1/0066* (2013.01); *H04L 7/048* (2013.01)

(58) Field of Classification Search
None
See application file for complete search history.

(56) References Cited

U.S. PATENT DOCUMENTS 6,023,783 A    2/2000   Divsalar et al.
6,430,722 B1   8/2002   Eroz et al.
(Continued)

OTHER PUBLICATIONS

Benedetto, et al., "Design of Parallel Concatenated Convolutional Codes", IEEE Transactions on Communications, vol. 44, No. 5, May 1996.

*Primary Examiner* — Mujtaba M Chaudry
(74) *Attorney, Agent, or Firm* — Potomac Technology Law, LLC

(57) ABSTRACT

A multiple access scheme is described. A first bit stream is scrambled from a first terminal according to a first scrambling signature. A second bit stream is scrambled from a second terminal according to a second scrambling signature, wherein the first bit stream and the second bit stream are encoded using a low rate code. The first scrambling signature and the second scrambling signature are assigned, respectively, to the first terminal and the second terminal to provide a multiple access scheme.

14 Claims, 12 Drawing Sheets

Related U.S. Application Data continuation of application No. 12/056,144, filed on Mar. 26, 2008, now abandoned.

(60) Provisional application No. 60/908,340, filed on Mar. 27, 2007.

(56) References Cited

U.S. PATENT DOCUMENTS

| | | | |
|---|---|---|---|
| 6,529,495 B1 | 3/2003 | Aazhang et al. | |
| 6,724,813 B1* | 4/2004 | Jamal | H04W 72/02 |
| | | | 375/219 |
| 6,940,827 B2* | 9/2005 | Li | H04B 1/707 |
| | | | 370/278 |
| 7,447,984 B2 | 11/2008 | Cameron et al. | |
| 7,746,758 B2 | 6/2010 | Stolpman | |
| 8,126,076 B2 | 2/2012 | Sartori et al. | |
| 2003/0037298 A1 | 2/2003 | Eleftheriou et al. | |
| 2003/0039301 A1* | 2/2003 | Bradley | H04B 1/707 |
| | | | 375/147 |
| 2003/0204808 A1 | 10/2003 | Mills | |
| 2004/0054960 A1 | 3/2004 | Eroz et al. | |
| 2004/0258177 A1 | 12/2004 | Shen et al. | |
| 2006/0224935 A1 | 10/2006 | Cameron et al. | |
| 2007/0223367 A1* | 9/2007 | Wu | H04L 1/0001 |
| | | | 370/216 |
| 2008/0019263 A1 | 1/2008 | Stolpman | |
| 2009/0187804 A1 | 7/2009 | Shen et al. | |
| 2010/0091902 A1* | 4/2010 | Park | H04L 1/1893 |
| | | | 375/295 |
| 2010/0100789 A1 | 4/2010 | Yu et al. | |
| 2011/0051825 A1 | 3/2011 | Tao et al. | |
| 2015/0236884 A1* | 8/2015 | Suh | H04L 27/2627 |
| | | | 375/295 |

* cited by examiner

METHOD AND SYSTEM FOR PROVIDING SCRAMBLED CODED MULTIPLE ACCESS (SCMA)

RELATED APPLICATIONS

This application is a continuation, and claims the benefit of the filing date under 35 U.S.C. § 120, from U.S. patent application Ser. No. 13/742,635 (filed 2013 Jan. 16), which is a continuation, and claims the benefit of the filing date under 35 U.S.C. § 120, from U.S. patent application Ser. No. 12/056,144 (filed 2008 Mar. 26, now abandoned), which claims the benefit of the earlier filing date under 35 U.S.C. § 119(e) from U.S. Provisional Patent Application Ser. No. 60/908,340 (filed 2007 Mar. 27); the entireties of which are incorporated herein by reference.

FIELD OF THE INVENTION

The present invention relates to communication systems, and more particularly to coded systems.

BACKGROUND OF THE INVENTION

Multiple access schemes are employed by modern radio systems to allow multiple users to share a limited amount of bandwidth, while maintaining acceptable system performance. Common multiple access schemes include Frequency Division Multiple Access (FDMA), Time Division Multiple Access (TDMA) and Code Division Multiple Access (CDMA). System performance is also aided by error control codes. Nearly all communication system relies on some form of error control for managing errors that may occur due to noise and other factors during transmission of information through a communication channel. These communications systems can include satellite systems, fiber-optic systems, cellular systems, and radio and television broadcasting systems. Efficient error control schemes implemented at the transmitting end of these communications systems have the capacity to enable the transmission of data including audio, video, text, etc. with very low error rates within a given signal-to-noise ratio (SNR) environment. Powerful error control schemes also enable a communication system to achieve target error performance rates in environments with very low SNR, such as in satellite and other wireless systems where noise is prevalent and high levels of transmission power are costly, if even feasible.

Thus, a broad class of powerful error control schemes that enable reliable transmission of information have emerged including convolutional codes, low density parity check (LDPC) codes, and turbo codes. Both LDPC codes as well as some classes of turbo codes have been successfully demonstrated to approach near the theoretical bound (i.e., Shannon limit). Although long constraint length convolutional codes can also approach the Shannon limit, decoder design complexity prevents practical, wide spread adoption. LDPC codes and turbo codes, on the other hand, can achieve low error rates with lower complexity decoders. Consequently, these codes have garnered significant attention.

For example, conventional data transmission to and from an ultra small terminal via satellite is usually based on Code Division Multiple Access (CDMA) technique using rate ½ or ⅓ turbo codes. CDMA spreads bandwidth to reduce the interference to adjacent satellites, whereas the turbo code provides coding gain needed to close the link. CDMA also allows multiple users sharing the bandwidth at the same time. However, CDMA systems typically need a large bandwidth expansion factor to function properly. Additionally, CDMA systems require all signals accessing the same spectrum at the same time to be of equal power; provision for power control makes CDMA system more complicated to implement. The inherent long propagation delay of a satellite link makes it even more difficult.

Based on the foregoing, there is a need for an access scheme that can effectively utilize low code rates, while minimizing complexity.

SUMMARY OF THE INVENTION

These and other needs are addressed by the present invention, wherein a scrambled division multiple access (SDMA) scheme is provided.

According to one aspect of an exemplary embodiment, a method comprises scrambling a first bit stream from a first terminal according to a first scrambling signature. The method also comprises scrambling a second bit stream from a second terminal according to a second scrambling signature, wherein the first bit stream and the second bit stream are encoded using a low rate code. The first scrambling signature and the second scrambling signature are assigned, respectively, to the first terminal and the second terminal to provide a multiple access scheme.

According to another aspect of an exemplary embodiment, an apparatus comprises a plurality of encoders, each encoder being configured to encode a first data stream from a first terminal and a second data stream from a second terminal using a low code rate. The apparatus also comprises a first scrambler configured to scramble the first bit stream from a first terminal according to a first scrambling signature. The apparatus further comprises a second scrambler configured to scramble the second bit stream from a second terminal according to a second scrambling signature. The first scrambling signature and the second scrambling signature are assigned, respectively, to the first terminal and the second terminal to provide a multiple access scheme.

According to another aspect of an exemplary embodiment, a method comprises applying joint detection and interference cancellation on a received composite signal, wherein the composite signal includes one or more encoded bit streams having a low code rate. The method also comprises estimating the encoded bit streams, descrambling the estimated bit streams, and decoding the descrambled bit streams. The method further comprises modifying the composite signal based on the decoded bit stream, and iteratively decoding bit streams of the modified composite signal.

According to yet another aspect of an exemplary embodiment, a system comprises a joint detector and interference canceller configured to detect and cancel interference from a received composite signal, wherein the composite signal includes one or more encoded bit streams having a low code rate. The system also comprises a demodulator configured to estimate the encoded bit streams, a plurality of descramblers configured to descramble the estimated bit streams, and a plurality of decoders configured to decode the bit streams. The system further comprises a plurality of scramblers configured to re-scramble the decoded bit streams, wherein the joint detector and interference canceller is further configured to modify the composite signal for subsequent iterative decoding by the decoders.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

A method, system, and software for providing a scrambled coded multiple access (SCMA) scheme is described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Although certain embodiments of the present invention are described with respect to low-rate turbo codes, it is contemplated that these embodiments have applicability to low-rate codes in general (e.g., low density parity check (LDPC)).

Figure 1A:
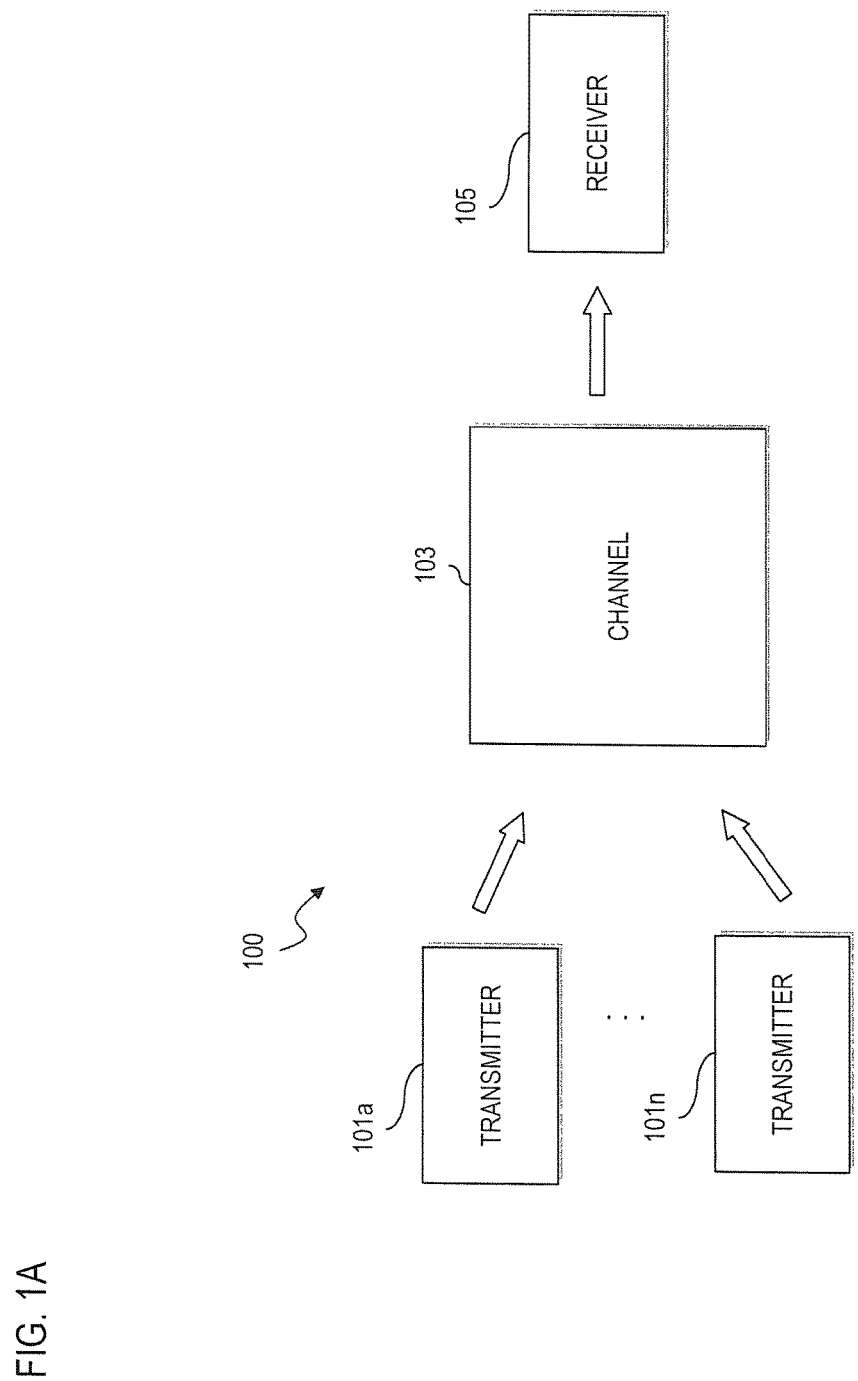
FIGS. 1A and 1B are communications systems capable of providing a scrambled division multiple access (SDMA) scheme, according to various exemplary embodiments.
Figure 1B:
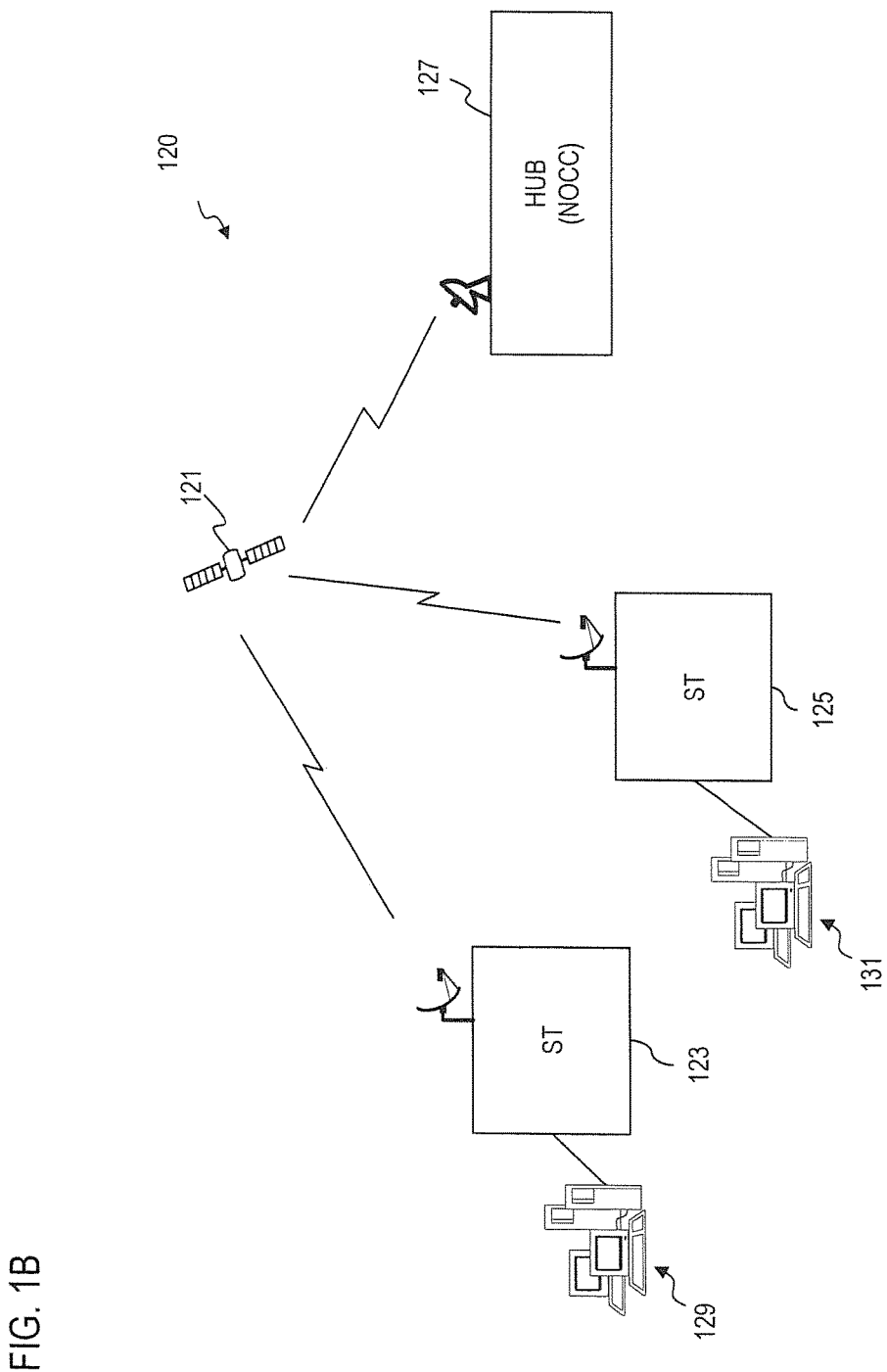

FIGS. 1A and 1B are communications systems capable of providing a scrambled division multiple access (SDMA) scheme, according to various exemplary embodiments. A digital communications system 100 includes one or more transmitters 101 that generate signal waveforms across a communication channel 103 to one or more receivers 105 (of which one is shown). In this discrete communications system 100, the transmitter 101 has a message source that produces a discrete set of possible messages; each of the possible messages has a corresponding signal waveform. These signal waveforms are attenuated, or otherwise altered, by communications channel 103. To combat the noise channel 103, coding is utilized. For example, forward error correction (FEC) codes can be employed.

Forward error correction (FEC) is required in terrestrial and satellite systems to provide high quality communication over a radio frequency (RF) propagation channel, which induces signal waveform and spectrum distortions, including signal attenuation (freespace propagation loss) and multi-path induced fading. These impairments drive the design of the radio transmission and receiver equipment; exemplary design objectives include selecting modulation formats, error control schemes, demodulation and decoding techniques and hardware components that together provide an efficient balance between system performance and implementation complexity. Differences in propagation channel characteristics, such as between terrestrial and satellite communication channels, naturally result in significantly different system designs. Likewise, existing communication systems continue to evolve in order to satisfy increased system requirements for new higher rate or higher fidelity communication services.

Code rate is an important factor that has a significant effect on the error performance of the code. The choice of which code rate to operate, in turn, depends on the SNR of the environment in which the codes will be deployed. Traditionally, low SNR environments require the use of low code rates (i.e., more redundancy), whereas high SNR environments can enable the utilization of higher code rates. There is a continual challenge to devise codes that edge closer to the Shannon limit, while minimizing complexity.

When considering turbo codes and LDPC codes, irregular LDPC codes have been demonstrated to achieve superior performance over turbo codes for high code rates, whereas turbo codes have been demonstrated to be superior for lower code rates in low SNR environments. For very low codes such as ⅙ or lower, the coding industry has focused on classical turbo code design, which can, in essence, be improved. Because turbo codes have traditionally been designed to maximize the minimum Hamming weight of systematic codewords (where the information part of the codeword has a Hamming weight of two), it is recognized that further coding improvements can be made. At relatively high SNR, this approach yields good codes since two codewords are most easily confused when their information part is differed by two bits, owing to the recursive nature of their constituent codes.

However, for very low SNR where low code rates are traditionally used, an investigation of the erroneous turbo code frames reveals that the number of errors in the information part, is in general, more than two. This observation suggests that by targeting minimum Hamming weight corresponding to information sequences with Hamming weight more than two, the performance of low code rates, in principle, can be enhanced. With improved design, low rate turbo codes can approach the Shannon limit more closely, resulting in a variety of advantages for communication systems such as extended battery lifetime within cellular networks, lower transmit power within satellite communication and broadcasting systems, etc.

FIG. 1B is a diagram of an exemplary meshed network capable of supporting communication among terminals with varied capabilities, according to an embodiment of the present invention.

Satellite communications system 120 includes a satellite 121 that supports communication among multiple satellite terminals (STs) 123, 125 and a hub 127. The hub 127 may assume the role of a Network Operations Control Center (NOCC), which controls the access of the STs 123, 125 to the network 120 and also provides element management functions and control of the address resolution and resource management functionality. The satellite 121, in an exemplary embodiment, operates as a packet switch (e.g., at a data link layer) that provides direct unicast and multicast communication among the STs 123, 125. The STs 123, 125 provide connectivity to one or more hosts 129, 131, respectively. According to one embodiment of the present invention, the system 120 has a fully meshed architecture, whereby the STs 123, 125 may directly communicate.

As previously discussed, a system in which terminals are deployed, particularly a satellite system, incompatibility problems may arise if different "generations" of terminals exist, in which one ST employs older hardware and/or software technologies than the other.

For newer, highly capable terminals to communicate with older (typically) less capable terminals, an exchange of information regarding the capabilities among the communicating terminals is needed. Specifically, the common air interface needs to support a discovery of the terminal's capabilities profile (or context information). These capabilities can include encryption scheme, compression scheme, segmentation and reassembly (SAR) scheme, automatic repeat request (ARQ) scheme, Quality-of-Service (QoS) parameters, power levels, modulation and coding schemes, power control algorithms, and link adaptation capabilities.)

Under a conventional approach, terminal profile can be readily exchanged over a network with a star topology where no peer-to-peer communication exists. For example, in the General Packet Radio Service (GPRS)/Universal Mobile Telecommunications System (UMTS) family of protocols, such capabilities profiles include a packet data protocol (PDP) context and a mobility management context. In an embodiment of the present invention, the concepts of PDP context and mobility management context are combined and the term packet data protocol (PDP) context is used in general to refer to terminal capabilities. It is recognized that these terminals can be mobile as well as non-mobile. In an exemplary embodiment, this PDP context, for example, which can provide information about the encryption algorithm, compression algorithm, modes of data link layer communication, and physical layer transfer capabilities is combined by the transmit ST with the Quality of Service (QoS) of a pending data flow to determine a packet transfer context to use in transmission of the flow. If a PDP context has been previously established, then the sending ST can autonomously create the packet transfer context, which both satisfies the QoS of the data flow and is compatible with the receive ST capabilities.

According to one embodiment, the exchange of terminal profile can be executed over a meshed network, in a peer-to-peer manner. The STs 123, 125 support the use of a negotiation procedure to determine the optimal configuration for transmission and reception of data. If a protocol implements control procedures or options in newer versions (i.e., flow-control/rate-control), older protocol versions are able to detect the initiation as a new unsupported procedure and report the same to the peer with minimal disruption in the flow of traffic.

The ST-ST protocol advantageously takes into account that even for peers of the same version, some capabilities may not necessarily be always supported due to local temporal processing/memory/congestion-related constraints. Additionally, the ST-ST protocol design provides for rapid developments in data communication technology.

Incompatibility between two STs is detected by the terminal that originates the traffic. Thus, potential misconfigurations or software incompatibilities can at least be identified, without requiring communication at the service level of the more capable ST. For example, one of the STs 123, 125 may need to be reconfigured in order to communicate with compression disabled in order to allow communication with an ST that does not support compression. It is noted that the capability is not necessarily a function of solely configuration or software compatibility, but may also be a function of current traffic load.

For each ST 123, 125, there exist some configuration information, including network configuration, network service provider (NSP) configuration, software configuration, and user configuration, as indicated by the NOCC 127. These configurations relate to the features that the ST 123, 125 supports and offers to the user, and have a direct bearing on the transmission and reception capabilities.

To facilitate the flow of data from one peer ST 123 to another ST 125 of possibly different generations equipped with different capabilities, a packet transfer context is employed. Such a common feature set depends on the PDP contexts of the two STs 123, 125; further, this common feature set may also depend on the QoS of the flow, as well as the loading and status of the two STs at that point of time. In an exemplary embodiment, the packet transfer context is unidirectional and valid only for the transmit ST to send packets to the specified receive ST; thus, the packet transfer context may be unique to a given pair of STs.

Figures 2, 3:
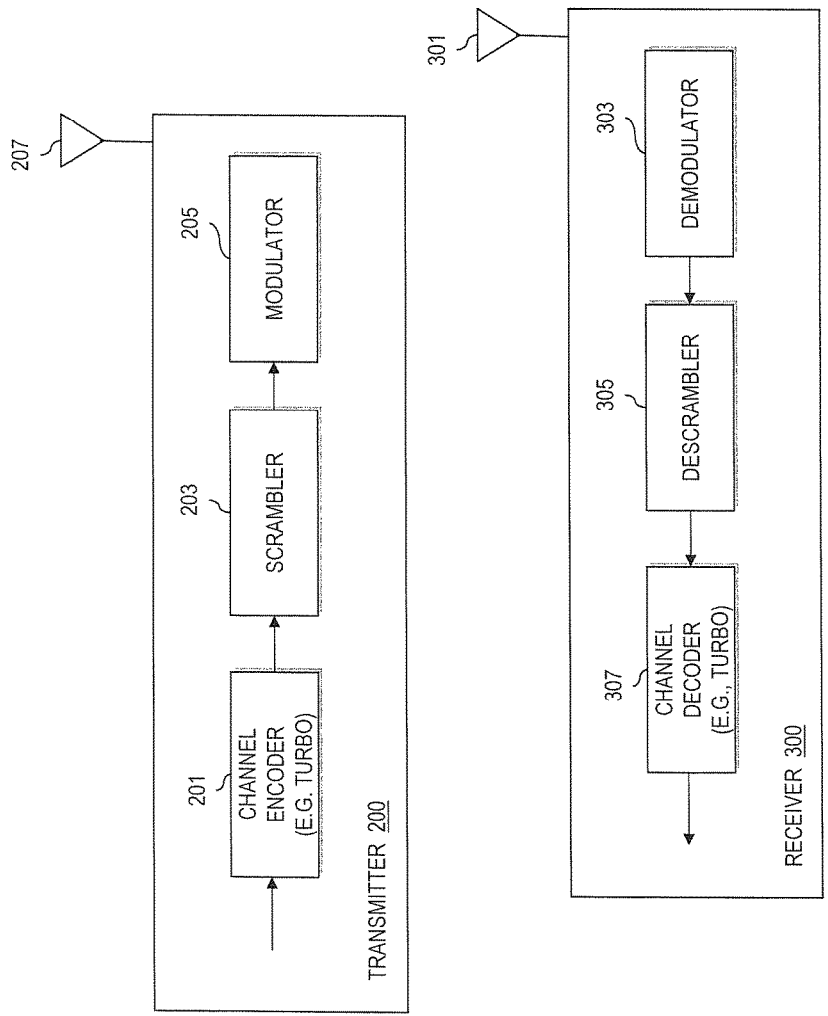
FIG. 2 is a diagram of a transmitter configured to operate in the systems of FIGS. 1A and 1B.
FIG. 3 is a diagram of a receiver configured to operate in the systems of FIGS. 1A and 1B.

FIG. 2 is a diagram of a transmitter configured to operate in the systems of FIGS. 1A and 1B. As seen in FIG. 2, a transmitter 200 is equipped with a channel encoder (e.g., turbo encoder) 201 that accepts input from an information source and outputs coded stream of higher redundancy suitable for error correction processing at the receiver (as shown in FIG. 3). The information source generates k signals from a discrete alphabet, X. The channel encoder 201 may utilize a combination of a constituent encoder that uses one or more constituent codes and an interleaver 203 to implement the channel coding procedure. Turbo codes are produced by parallel concatenation of two codes (e.g., convolutional codes) with an interleaver in between the encoders (as seen in FIG. 4).

Essentially, the encoder 201 generates signals from alphabet Y to a channel scrambler 203, which scrambles the alphabet. That is, the channel scrambler 203 pseudo-randomizes the code symbols. The scrambled signals are fed to a modulator 205, which maps the encoded messages from encoder 201 to signal waveforms that are transmitted to a transmit antenna 207.

The antenna 207 emits these waveforms over the communication channel 103. Accordingly, the encoded messages are modulated and distributed to a transmit antenna 207.

The transmissions from the transmit antenna 207 propagate to a receiver, as discussed below.

FIG. 3 is a diagram of a receiver configured to operate in the systems of FIGS. 1A and 1B. At the receiving side, a receiver 300 includes an antenna 301 that receives the waveforms emitted over the channel 103. The receiver 300 provides a demodulator 303 that performs demodulation of the received signals. After demodulation, the received signals are forwarded to a channel de-scrambler 305 to unscramble the symbols. A decoder 307 then attempts to reconstruct the original source messages.

It is contemplated that the above transmitter 200 and receiver 300 can be deployed in within a single wireless terminal, in which case a common antenna system can be shared. The wireless terminal can for example be configured to operate within a satellite communication, a cellular system, wireless local area network (WLAN), etc.

Figure 4A:
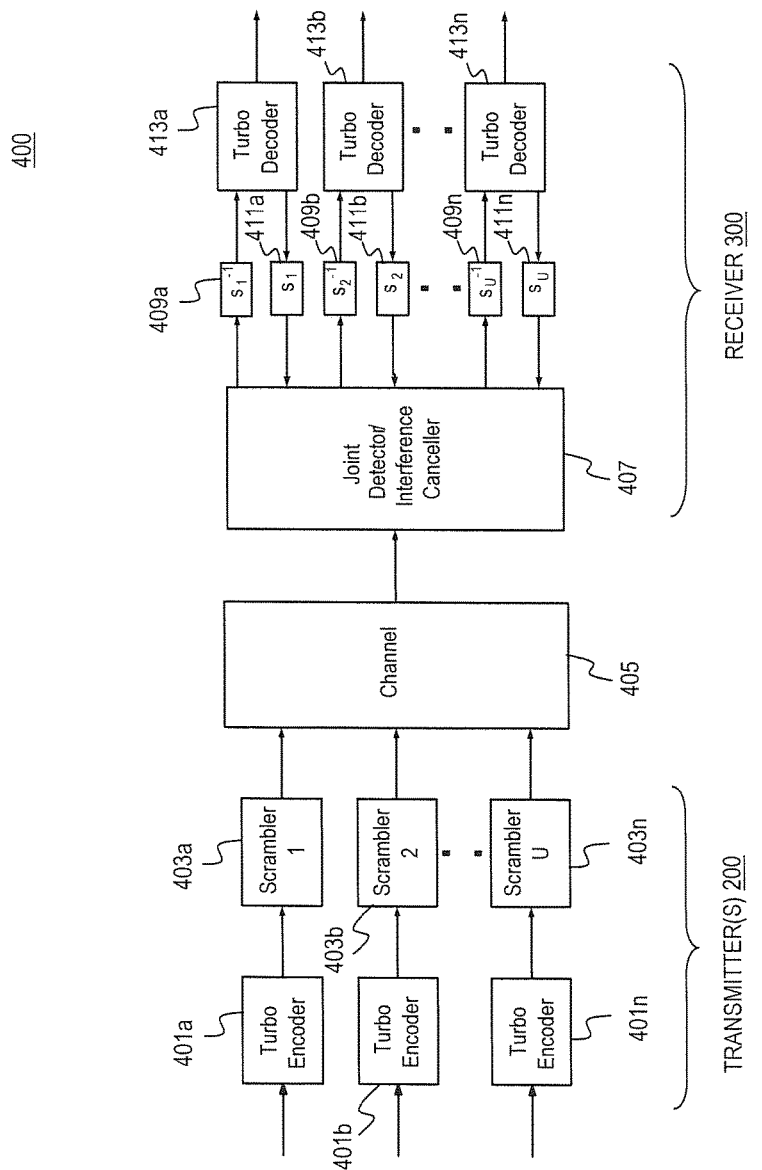
FIGS. 4A and 4B, are, respectively, a diagram of a system capable of supporting multiple transmitters using a SDMA scheme employing low rate turbo codes, and a flowchart of an associated scrambling process, according to an exemplary embodiment.
Figure 4B:
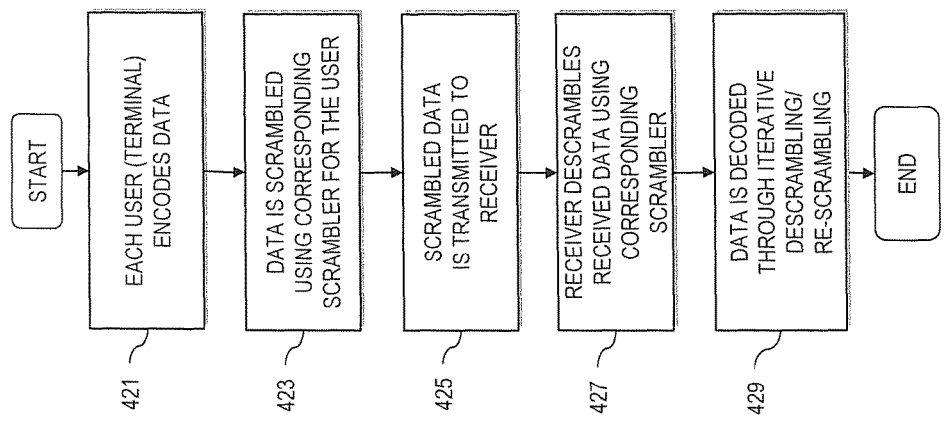

FIGS. 4A and 4B, are, respectively, a diagram of a system capable of supporting multiple transmitters using a SDMA scheme employing low rate turbo codes, and a flowchart of an associated scrambling process, according to an exemplary embodiment. For the purposes of illustration, a communication system 400 supports multiple terminals (i.e., users) configured with respective encoders 401a-401n and scramblers 403a-403n. In an exemplary embodiment, these terminals can be the transmitter 200 and the receiver 300 of FIGS. 2 and 3, respectively, operating in the satellite system 120 of FIG. 1B.

By way of example, the system 400 provides a multiple access scheme, such as SCMA, which achieves good performance with relatively lower receiver complexity compared to CDMA (as the number of users that share the same channel increases). With SCMA, each user sharing the transmission channel is separated by user specific and scramblers 403a-403n. Also, due to lack of spreading factor and more efficient FEC coding, a fraction of a satellite transponder is needed under the SCMA scheme, thereby lowering the operating cost.

By using low rate codes, the system 400 can achieve greater power efficiency while spreading the spectrum, whereas conventional CDMA does not. Additionally, SCMA is different from another multiple access technique called Interleave-Division Multiple Access (IDMA) which also spreads with low-rate turbo-Hadamard codes but uses random interleavers as user signature. The low-rate turbo decoders in SCMA are much more straightforward to implement since turbo-Hadamard codes require the decoding of Hadamard codes in addition to the decoding of turbo-like codes. Also, all the users can utilize the same scrambler hardware with different initial vector (also known as "seed"), instead of different interleaver design. Further, using scrambling sequences as signatures is simpler than random interleaver-based signatures.

In one embodiment, each of turbo encoders 401a-401n utilizes the same turbo codes. The turbo encoded sequences are then fed to the respective user-specific scramblers 403a-403n. The scrambled sequences are then transmitted over channel 405 to a receiver 300, which includes a joint detector/interference canceller unit 407 that interacts with the turbo decoders 413a-413n to iteratively produce an estimate of the received codewords. With each iteration, the turbo decoder 413a-413n produces a better estimate to the joint detector/interference canceller 407 for achieving better cancellation. The information exchanged between turbo decoders 413a-413n and the joint detector/interference canceller 407 is scrambled or descrambled via scramblers 409a-409n or de-scramblers 411a-411n, respectively. Once "good" estimates of the decoded sequences are produced, they are output from the turbo decoders 413a-413n.

Unlike conventional CDMA systems, the joint-detection/interference canceller 407 does not require all the signals accessing the same spectrum at the same time to be of equal power. In fact, the performance is better when the signals are of different power level. Thus, no tight power controls are needed. Also due to joint-detection/interference cancellation, the system 400 provides a scheme that is much more robust against Rician fading, which makes it particularly more attractive for small mobile terminals experiencing Rician multipath fading.

Therefore, the system 400, as a SCMA system using low-rate FEC coding, requires less power to transmit data at the same speed vis-à-vis a CDMA system. In one embodiment, the system 400 can be operated in a random access manner and does not require reservation of time slots, which minimize the delay to one satellite round trip. Additionally, the system 400, as mentioned, does not require tight power control, minimizing the coordination needed between transmitter 200 and receiver 300. By way of example, potential applications will be for mobile or aeronautical terminals. It may also have applications to enable direct broadcast satellite (DBS) operators to provide return link over satellite via a commercial satellite using existing antenna systems.

Each user encodes its data with, for example, a rate 1/n FEC, where n is an integer larger than 3. The coded bits are then scrambled with a unique scrambling sequence and transmitted. The number of unique sequences are virtually unlimited with common sequence generators, such as the Gold sequences. The same generator can generate all the sequences, which are differentiated by the initial vector. It is noted that other low rates can be utilized, m/n (e.g., less than 1/3).

In an exemplary embodiment, the scrambling sequence can be generated by selecting a pseudorandom number sequence (e.g., Gold sequence) whose period is greater than the code block. On the receiver side, the respective user uses the corresponding de-scrambler and a rate 1/n decoder to retrieve its data. The signals are modulated by the same type of modulation, e.g., QPSK, of the same bandwidth, centered at the same frequency and transmitted at the same time (e.g., similar to CDMA). Typically, for receivers located in a hub of a star-shaped network, the antennas can be shared.

The system 400 operates as follows. In step 421, each terminal encodes data using the corresponding turbo encoder (e.g., 401a-401n). The encoded data is then scrambled by the respective scramblers 1 . . . U (e.g., 403a-403n) and transmitted to the receiver 300, per steps 423 and 425. Next, the received signal is processed by the joint detector/interference canceller 407 and undergoes descrambling and re-scrambling, as in step 427. The descrambling and re-scrambling is performed in conjunction with the decoding process, which outputs decoded data (step 429).

Figure 5:
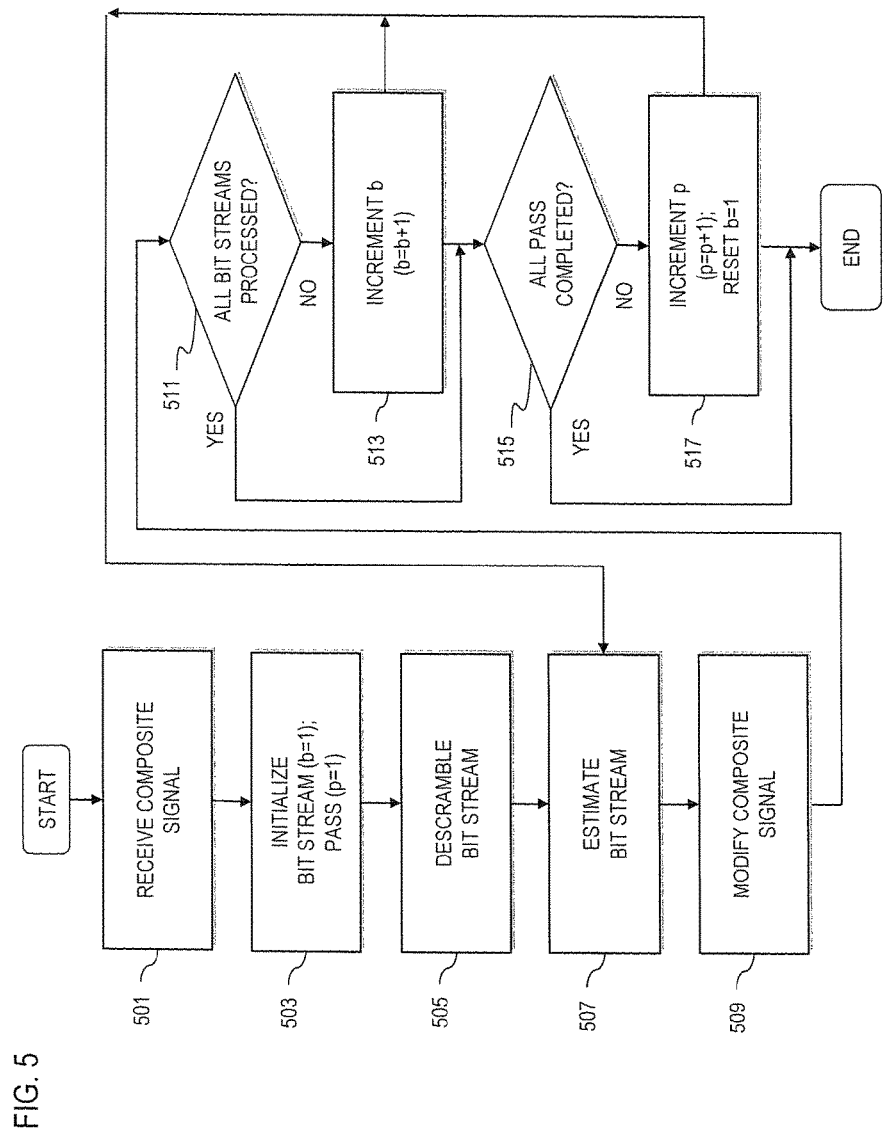
FIG. 5 is a flowchart of a process for joint detection/interference cancellation in the system of FIG. 4A, according to an exemplary embodiment.

FIG. 5 is a flowchart of a process for joint detection/interference cancellation in the system of FIG. 4A, according to an exemplary embodiment. A key enabler for this communication system 400 is the joint-detection/interference cancellation receiver. This receiver 300 includes the descramblers 409a-409n and the decoders 413a-413n as well as all the signal estimators and interference reducers for each of the individual signal paths. In addition, the receiver 300 includes a buffer (not shown) to store a complete block of the composite signal. The receiver 300 employs joint detection/estimation; it is contemplated that any joint-detection/estimation technique may be used. In an exemplary embodiment, the receiver 300 operates iteratively to output the bit streams represented by the composite signal.

As seen in FIG. 5, in steps 501-507, once an entire block of composite waveform is sampled and stored in the buffer, the receiver 300 first uses the first descrambler (e.g., descrambler 409a) and a turbo decoder (e.g., decoder 413a) to estimate the first bit-stream. In step 509, the composite signal is modified accordingly. In this example, only one pass of the turbo decoding is performed. The interference reducer then operates on the stored waveform given the result of the first pass decoding of the first signal. The receiver 300 then uses the second descrambler (e.g., descrambler 409b) and turbo decoder (e.g., decoder 413b) to estimate the second bit-stream, and so on. When all the bit-streams have been estimated once (as determined in step 511), the receiver 300 than returns to process the first bit-stream in a second pass.

When all the bit-streams have been processed for the required number passes (steps 513-517), all the bit-streams are completely estimated and decoded.

Alternatively, in another embodiment, all the paths can be processed in-parallel for each pass; this approach may entail more passes than the above process.

Signal estimation, via a demodulator (not shown), plays an important role. In most applications of interest, this demodulator must operate at very low signal-to-noise plus interference ratio. In one embodiment, the demodulator is aided by two features: synchronization, and joint detection. The initial synchronization involves use of a known pilot, which can be introduced using anyone of the techniques known in the art. For example, known pilot symbols can be introduced by multiplexing them into the data stream, or pilot symbols may be introduced by puncturing the encoder output. Just as each encoder 401a-401n employs a different scrambling signature, each may employ a different pilot symbol pattern, thereby minimizing interference effects.

In one embodiment, the signals are transmitted in a burst mode. Accordingly, the demodulator is configured to detect the burst arrival times by using, for example, a "Unique Word" pattern. It is recognized that any other well-known techniques may be used for this purpose. The Unique Word patterns of the various encoders may or may not be distinct.

With respect to joint detection, this process involves iterative refinement of the demodulation. As the iteration progresses, the demodulation is improved through two techniques. First, as interference is removed, the estimation of signal parameters (e.g., frequency, symbol timing, carrier phase) is improved. Secondly, as more reliable estimates of the data symbols become available from the turbo decoders 413a-413n, these are used to improve the demodulator performance.

Figure 6:
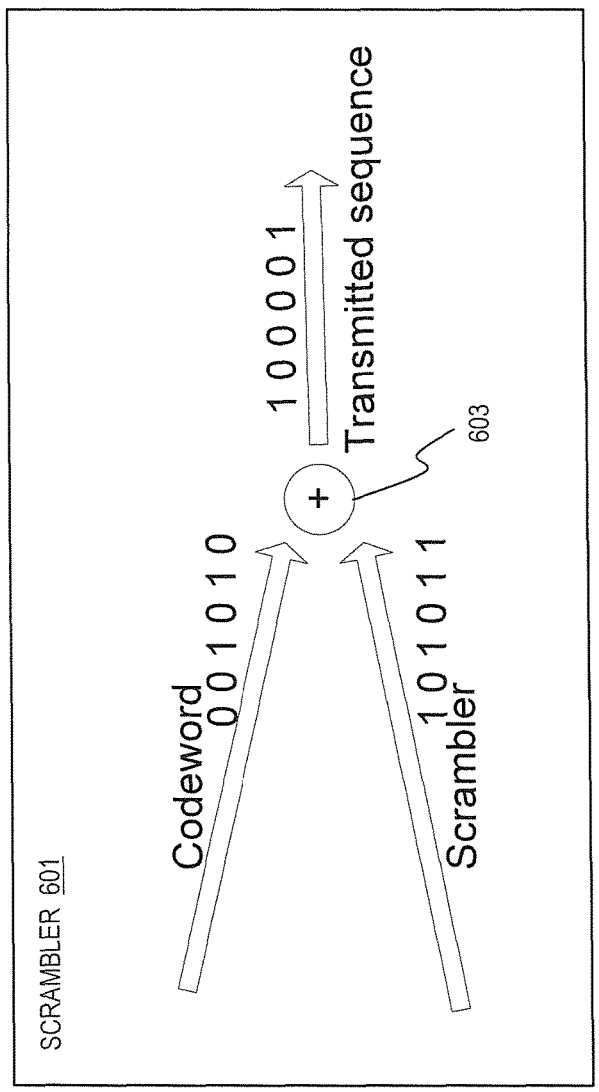
FIG. 6 is a diagram of a scrambler, in accordance with various exemplary embodiments.

FIG. 6 is a diagram of a scrambler, in accordance with various exemplary embodiments. In this example, a scrambler 601 receives a codeword (e.g., "0 0 1 0 1 0") and a scrambling sequence (e.g., "1 0 1 0 1 1"). The scrambling sequence (or signature) can be a Gold sequence or any pseudorandom number sequence. Gold codes exhibit a number of characteristics. In addition to being simple to generate, these sequences contain roughly an equal number of zeros and ones, and are approximately orthogonal when delayed or shifted. Also, they are orthogonal to other codes. Gold sequences can be generated using feedback shift registers, whose outputs are added to produce the Gold codes. The codeword and scrambling sequence are combined by adder 603 to output a transmitted sequence (e.g., "1 0 0 0 0 1").

As mentioned, use of scramblers (as opposed to interleavers) reduces complexity. In a large system with numerous users, it is difficult to deploy a large number of interleavers that are prearranged between each pair of sender and receiver, whereas a common scrambler with different initial vector (also known as "seed") can be used for each pair of sender and receiver. Such arrangement is substantially easier to implement.

Figure 7:
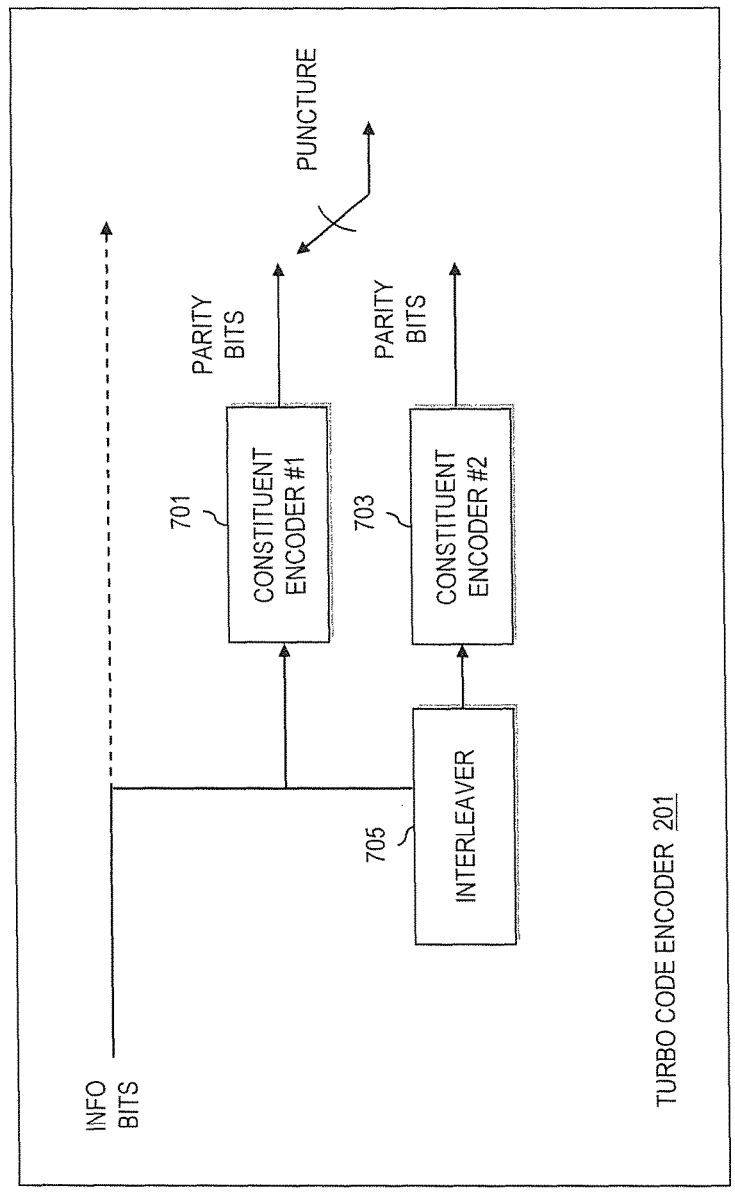
FIG. 7 is a diagram of a turbo code encoder configured to use constituent encoders, in accordance with various exemplary embodiments.

FIG. 7 is a diagram of a turbo code encoder configured to use constituent encoders, in accordance with various exemplary embodiments. In this example, turbo encoder 201 employs two constituent encoders 701, 703 and an interleaver 705. Although two encoders 701, 703 are described in this scenario, the encoder 201 can provide more than two encoders to achieve various code rates. As seen in FIG. 7, the turbo encoder 201 can optionally output the information (i.e., systematic) bit as part of the output code, depending on the design of the constituent encoders 701, 703 and the code rates. The operation of the turbo code encoder 201 is explained with respect to FIG. 8, as follows.

Figure 8:
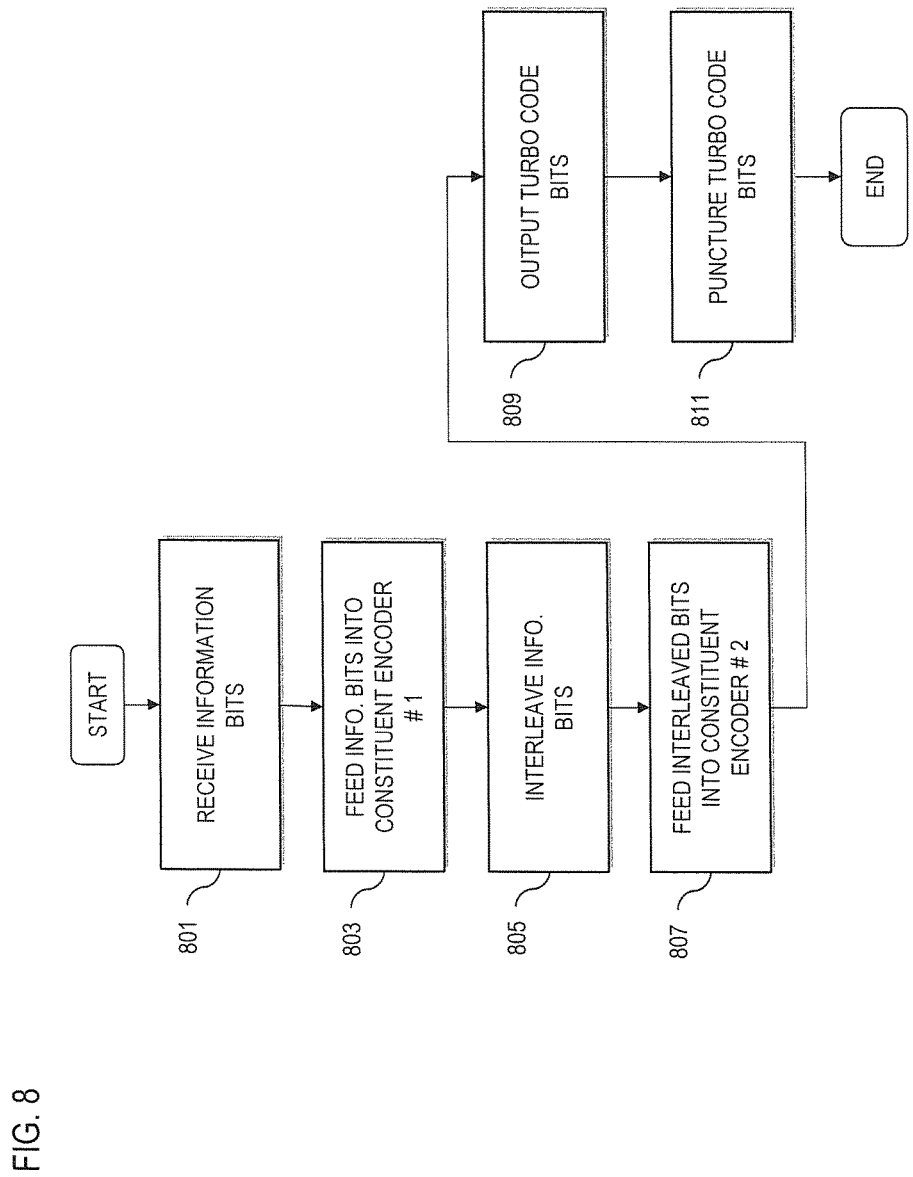
FIG. 8 is a flowchart of a process for turbo code encoding, according to an exemplary embodiment.

FIG. 8 is a flowchart of a process for turbo code encoding, according to an exemplary embodiment. Information bits that are to be turbo code encoded are fed to both constituent encoders 701 and 703 (step 801). The bits that are fed to constituent encoder 703 are, however, interleaved by interleaver 705 prior to being input to constituent encoder 703, as in steps 803-807. In steps 809 and 811, once both bit streams are encoded, the output of constituent encoders 701, 703 is punctured to achieve the desired code rate. According to an exemplary embodiment, the output of turbo encoder 201 can contain the unpunctured bits at the output of constituent encoders 701, 703 and, alternatively, the information bits that have not undergone any processing, as illustrated in FIG. 7.

Figure 9:
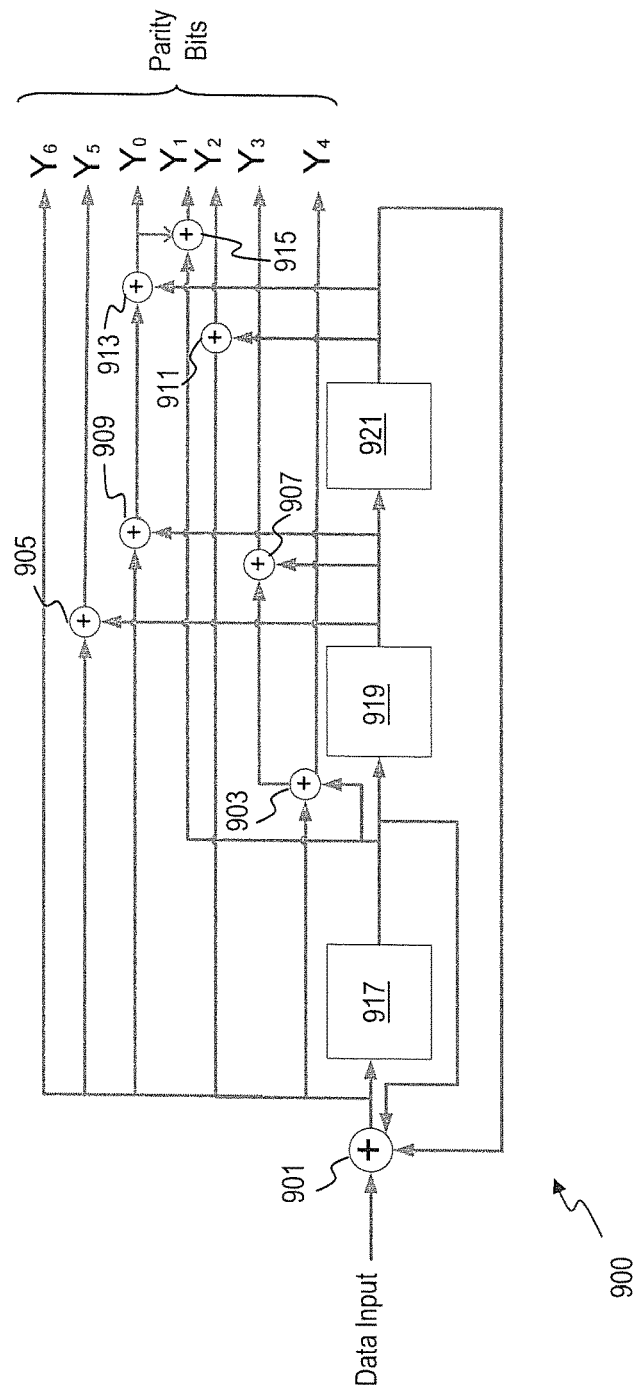
FIGS. 9 and 10 are diagrams of constituent encoders configured to provide low rate turbo codes, in accordance with various exemplary embodiments.
Figure 10:
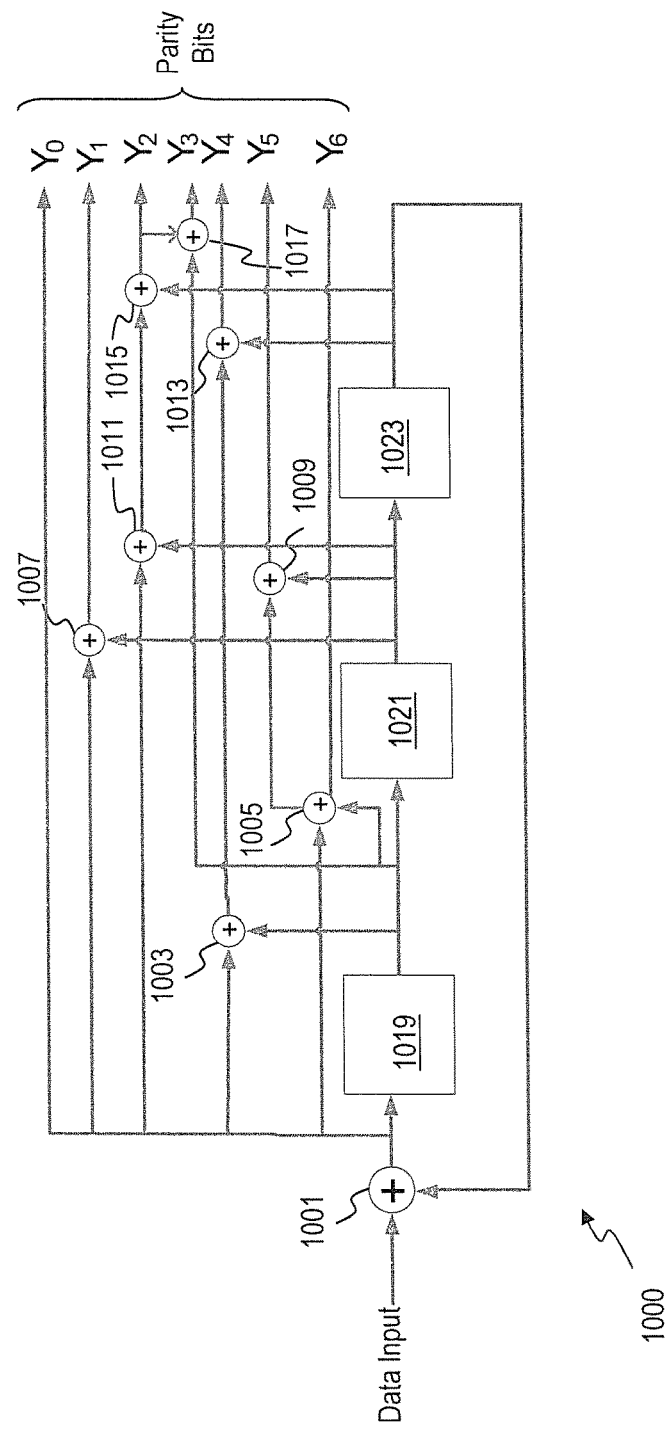

FIGS. 9 and 10 are diagrams of constituent encoders configured to provide low rate turbo codes, in accordance with various exemplary embodiments. A constituent encoder 900 provides code rates of 1/14, 1/12, 1/10, 1/8, 1/6, and 1/4. When implemented in the turbo encoder 201 of FIG. 7, the encoder 201 does not output the information bits given these code rates. For rate 1/14 turbo code, all seven parity bits of the constituent code are transmitted. For rate 1/12 turbo code, $Y_6$ is punctured from both constituent codes, for rate 1/10 turbo code $Y_5$ and $Y_6$ are punctured, for rate 1/8 turbo code, $Y_4$, $Y_5$ and $Y_6$ are punctured, for rate 1/6 turbo code $Y_3$, $Y_4$, $Y_5$ and $Y_6$ are punctured and for rate 1/4 turbo code, $Y_2$, $Y_3$ and $Y_4$, $Y_5$ and $Y_6$ are punctured from both constituent codes. The transfer function of the constituent encoder 900 is given as:

$$G(D) = \left[\frac{n_0(D)}{d(D)}, \frac{n_1(D)}{d(D)}, \ldots \frac{n_6(D)}{d(D)}\right]$$

where, $$d(D) = 1 + D + D^3$$

$$n_0(D) = 1 + D^2 + D^3$$

$$n_1(D) = 1 + D + D^2 + D^3$$

$$n_2(D) = 1 + D^3$$

$$n_3(D) = 1 + D + D^2$$

$$n_4(D) = 1 + D$$

$$n_5(D) = 1 + D^2$$

$$n_6(D) = 1.$$

As seen, the logic or circuitry for the encoder 900 encompasses adders 901, 903, 905, 907, 909, 911, 913, and 915 and shift registers 917, 919 and 921. Modular adder 901 receives the data input, adding it together with the output of registers 917 and 921. The output of adder 901 produces the parity bit $Y_6$ and is also fed into adders 903, 911, 909 and 905. Modular adder 903 sums the signals from adder 901 and register 917, resulting in the parity bit $Y_4$; the summed value is additionally provided to adder 907. Adder 905 receives inputs from register 919 and adder 901, and produces the parity bit $Y_5$ at its output.

Further, adder 907 sums the values from adder 903 and register 919 to generate parity bit $Y_3$. Adder 909 receives inputs from register 919 and adder 901 to produce a value, which is then fed into adder 913. Adder 911 adds the value from register 921 as well as the value from adder 901; the resultant value is the parity bit $Y_2$. As for adder 913, this adder 913 produces parity bit $Y_0$ from the summation of a value from adder 909 and register 921. Adder 915 receives inputs from adder 913 and register 921 to generate parity bit $Y_1$.

FIG. 10 shows a block diagram of a constituent encoder 1000 for achieving varying code rates, such as 1/15. The transfer function of the constituent encoder 1000 is as follows:

$$G(D) = \left[\frac{n_0(D)}{d(D)}, \frac{n_1(D)}{d(D)}, \cdots \frac{n_6(D)}{d(D)}\right]$$

where, $$d(D) = 1 + D^3$$
$$n_0(D) = 1$$
$$n_1(D) = 1 + D^2$$
$$n_2(D) = 1 + D^2 + D^3$$
$$n_3(D) = 1 + D + D^2 + D^3$$
$$n_4(D) = 1 + D + D^3$$
$$n_5(D) = 1 + D + D^2$$
$$n_6(D) = 1 + D.$$

To generate the parity bits according to this transfer function, the constituent encoder 1000 has circuitry that includes modular adders 1001, 1003, 1005, 1007, 1009, 1011, 1013, 1015, and 1017 and shift registers 1019, 1021, and 1023.

As seen, modular adder 1001 adds the output of register 1023 with the data input and generates parity bit $Y_0$, which is also supplied into adders 1005, 1003, 1011, and 1007. Adder 1003 receives input from adder 1001 and register 1019, summing these inputs for a resultant value that is fed into adder 1013. At adder 1005, signals from adder 1001 and register 1019 are summed to yield parity bit $Y_6$—which is also fed into adder 1009.

Adder 1007 adds the input from adder 1001 and the input from register 1021, to provide parity bit $Y_1$. Parity bit $Y_5$ can be generated through the summation, at adder 1009, of the values from adder 1005 and register 1021. With respect to adder 1011, inputs from adder 1001 and register 1021 are added by adder 1011 and provided to adder 1015. Adder 1013 receives input from adder 1003 and register 1023 to generate parity bit $Y_4$. Parity bit $Y_2$ is formed by the addition of the result from adder 1011 and content of register 1023. Adder 1017 receives inputs from adder 1015 and register 1019 and produces parity bit $Y_3$ at its output. Under this arrangement (i.e., code rate of 1/15), the turbo encoder 201 of FIG. 7 outputs the systematic bit, by contrast to the constituent encoders 900, 1000 of FIGS. 9 and 10, respectively, in which no information bit is output by the turbo encoder 201.

It should be noted that, according to certain embodiments, the low rate turbo codes described herein have been developed by targeting minimum Hamming weight corresponding to information sequences with Hamming weight more than two. Using this approach, a search for new turbo codes was conducted using a uniform interleaving assumption and constraining the Hamming weight of input sequences to a maximum of six, for instance.

Figure 11:
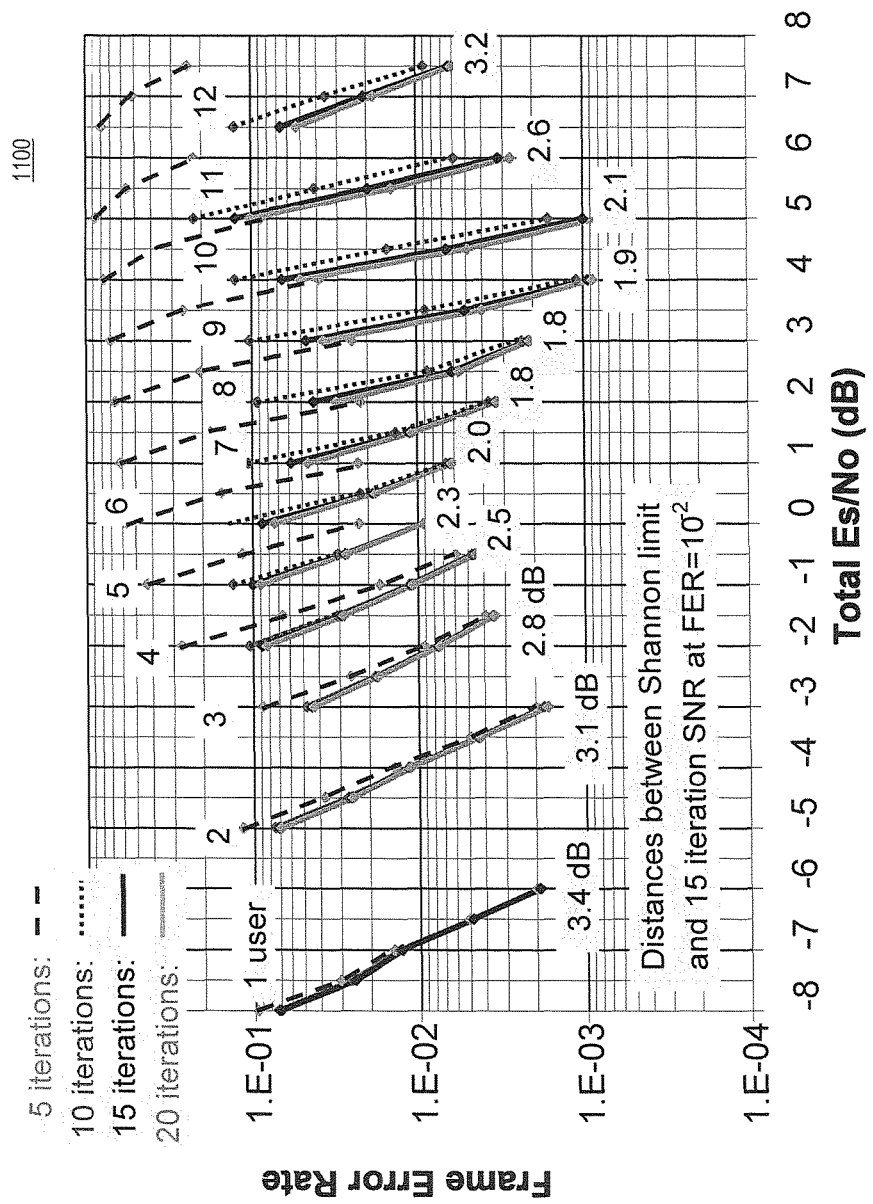
FIG. 11 is a graph illustrating the performance of the SDMA system of FIG. 4A.

FIG. 11 is a graph illustrating the performance of the SDMA system of FIG. 4. Specifically, in graph 1100, the performance of system 400 is compared against Shannon's constrained capacity for QPSK modulation as a function of the aggregated signal power per symbol time over one-sided noise spectral density in an Additive White Gaussian Noise (AWGN) channel (e.g., using a rate 1/10 code). A relatively short 1000 information bit frame length is used. As seen, up to about five simultaneous overlapping transmission that are close to a theoretically best with unlimited processing. The corresponding energy per symbol over one-sided noise spectral density ratio (Es/No) for each individual user terminal and the energy per information bit to one-sided noise spectral density ratio (Ebi/No) to achieve $10^{-5}$ frame error rate is shown in Table 1, as the aggregated power are evenly divided to each user terminal.

TABLE 1

| No. of Users | 1 | 2 | 3 | 4 | 5 | 6 | 7 |
|---|---|---|---|---|---|---|---|
| Es/No (dB) per user | −6.7 | −6.3 | −6.1 | −5.7 | −5.0 | −3.9 | −2.3 |
| Ebi/No (dB) per user | 0.3 | 0.7 | 0.9 | 1.3 | 2.0 | 3.1 | 4.7 |

Conventional spectral spreading achieves emission reduction, but does not offer additional coding gain. When applied to a star-shaped satellite network, the approach of system 400 can be applied for both the forward link and the return link. In the forward link, the advantage is mainly the lower Ebi/No that is required by the lower rate code is lower than required by the rate 1/3 or rate 1/4 code previously used. The lower operating threshold allows the terminal to accept more adjacent satellite interference, which is often the dominating performance limitation for small terminals. The advantage of the low-rate code can be applied to reduced receive antenna size, or higher bit rate.

In the return link, the combination of low-rate code and SCMA allows the terminal to operate autonomously with minimum coordination with the hub. Unlike conventional CDMA, interference cancellation operates better when the terminals are not operating at exactly the same power, tight power control is in fact not desirable. The bandwidth expansion from the low-rate coding serves two purposes reduction of emission spectral density from regulator standpoint; and additional coding gain.

The processes described herein for generating low rate codes and scrambling may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    encoding, by an encoder of first data communications terminal, a first bit stream using a low rate forward error correction (FEC) code to generate a first encoded data stream;
    encoding, by an encoder of a second data communications terminal, a second bit stream using the low rate FEC code to generate a second encoded data stream;
    scrambling, by a scrambler of the first data communications terminal, the first encoded data stream based on a first scrambling signature; and
    scrambling, by a scrambler of the second data communications terminal, the second encoded data stream based on a second scrambling signature;
    modulating, by a modulator of the first data communications terminal, the scrambled first encoded data stream to generate a first modulated data signal for transmission over a wireless data communications channel; and
    modulating, by a modulator of the second data communications terminal, the scrambled second encoded data stream to generate a second modulated data signal for transmission over the wireless data communications channel; and
    wherein the low rate FEC code is of a rate less than ⅓, and
    wherein the first scrambling signature and the second scrambling signature are assigned, respectively, to the first terminal and the second terminal to distinguish the first encoded data stream from the second encoded data stream as respectively originating from the first terminal and the second terminal in a multiple access scheme, where the first encoded data stream and the second encoded data stream are configured to simultaneously share the wireless data communications channel and to be decoded by a receiving data communications terminal via a joint detection/interference cancellation process.

2. A method according to claim 1, further comprising:
    generating an output data stream that includes the encoded bit streams and one or more pilot symbols for synchronization.

3. A method according to claim 1, wherein the encoding of each of the first and second bit streams comprises a turbo code encoding, which utilizes constituent encoding having a transfer function:

$$G(D) = \left[\frac{n_0(D)}{d(D)}, \frac{n_1(D)}{d(D)}, \cdots \frac{n_4(D)}{d(D)}\right]$$

where, $$d(D) = 1 + D + D^3$$
$$n_0(D) = 1 + D^2 + D^3$$
$$n_1(D) = 1 + D + D^2 + D^3$$
$$n_2(D) = 1 + D^3$$
$$n_3(D) = 1 + D + D^2$$
$$n_4(D) = 1 + D.$$

4. A method according to claim 1, wherein the bit streams are encoded by a plurality of constituent encoders utilizing identical transfer functions.

5. A method according to claim 1, wherein the rate of the low rate FEC code is rate 1/14, rate 1/12, rate 1/10, rate 1/8, rate 1/6, or rate 1/4.

6. A method according to claim 1, wherein the scrambling signatures include Gold sequences.

7. A data communications terminal comprising:
    an encoder configured to encode a bit stream of the data communications terminal using a low rate forward error correction (FEC) code to generate an encoded data stream, wherein the low rate FEC code is of a rate less than ⅓;
    a scrambler configured to scramble the encoded data stream based on a scrambling signature; and
    a modulator configured to modulate the scrambled encoded data stream to generate a modulated data signal for transmission over a wireless data communications channel; and
    wherein the scrambling signature is configured to distinguish the encoded data stream from a further encoded data stream of a further data communications terminal, and to distinguish the encoded data stream as originating from the data communications terminal in a multiple access scheme, where the encoded data stream is configured to simultaneously share the wireless data communications channel with the further encoded data stream and to be decoded by a receiving data communications terminal via a joint detection/interference cancellation process.

8. The data communications terminal according to claim 7, wherein the data communications terminal is configured to generate an output data stream that includes the encoded data stream and one or more pilot symbols for synchronization.

9. The data communications terminal according to claim 7, wherein the encoding of the bit stream comprises a turbo code encoding, which utilizes constituent encoding having a transfer function:

$$G(D) = \left[\frac{n_0(D)}{d(D)}, \frac{n_1(D)}{d(D)}, \cdots \frac{n_4(D)}{d(D)}\right]$$

where, $$d(D) = 1 + D + D^3$$
$$n_0(D) = 1 + D^2 + D^3$$
$$n_1(D) = 1 + D + D^2 + D^3$$
$$n_2(D) = 1 + D^3$$
$$n_3(D) = 1 + D + D^2$$
$$n_4(D) = 1 + D.$$

10. The data communications terminal according to claim 7, wherein the bit streams are encoded by a plurality of constituent encoders utilizing identical transfer functions.

11. The data communications terminal according to claim 7, wherein the rate of the low rate FEC code is rate 1/14, rate 1/12, rate 1/10, rate 1/8, rate 1/6, or rate 1/4.

12. The data communications terminal according to claim 7, wherein the scrambling signature includes a Gold sequence.

13. A data communications system comprising:
    a first data communications terminal comprising an encoder configured to encode a first bit stream of the first data communications terminal using a low rate forward error correction (FEC) code to generate a first encoded data stream, a scrambler configured to scramble the first encoded data stream based on a first scrambling signature, and a modulator configured to modulate the scrambled first encoded data stream to generate a first modulated data signal for transmission over a wireless data communications channel; and a second data communications terminal comprising an encoder configured to encode a second bit stream of the second data communications terminal using a low rate forward error correction (FEC) code to generate a second encoded data stream, a scrambler configured to scramble the second encoded data stream based on a second scrambling signature, and a modulator configured to modulate the scrambled second encoded data stream to generate a second modulated data signal for transmission over the wireless data communications channel; and wherein the low rate FEC code is of a rate less than ⅓, and wherein the first scrambling signature and the second scrambling signature are assigned, respectively, to the first terminal and the second terminal to distinguish the first encoded data stream from the second encoded data stream as respectively originating from the first terminal and the second terminal in a multiple access scheme, where the first encoded data stream and the second encoded data stream are configured to simultaneously share the wireless data communications channel and to be decoded by a receiving data communications terminal via a joint detection/interference cancellation process.

14. The data communications system according to claim 13, wherein the encoding of each of the first and second bit streams comprises a turbo code encoding, which utilizes constituent encoding having a transfer function:

$$G(D) = \left[ \frac{n_0(D)}{d(D)}, \frac{n_1(D)}{d(D)}, \cdots \frac{n_4(D)}{d(D)} \right],$$

where, $$d(D) = 1 + D + D^3$$
$$n_0(D) = 1 + D^2 + D^3$$
$$n_1(D) = 1 + D + D^2 + D^3$$
$$n_2(D) = 1 + D^3$$
$$n_3(D) = 1 + D + D^2$$
$$n_4(D) = 1 + D.$$

* * * * *